Inventor
Roger C. Bergstrom
By McCanna, Morsbach & Pillote
Attys

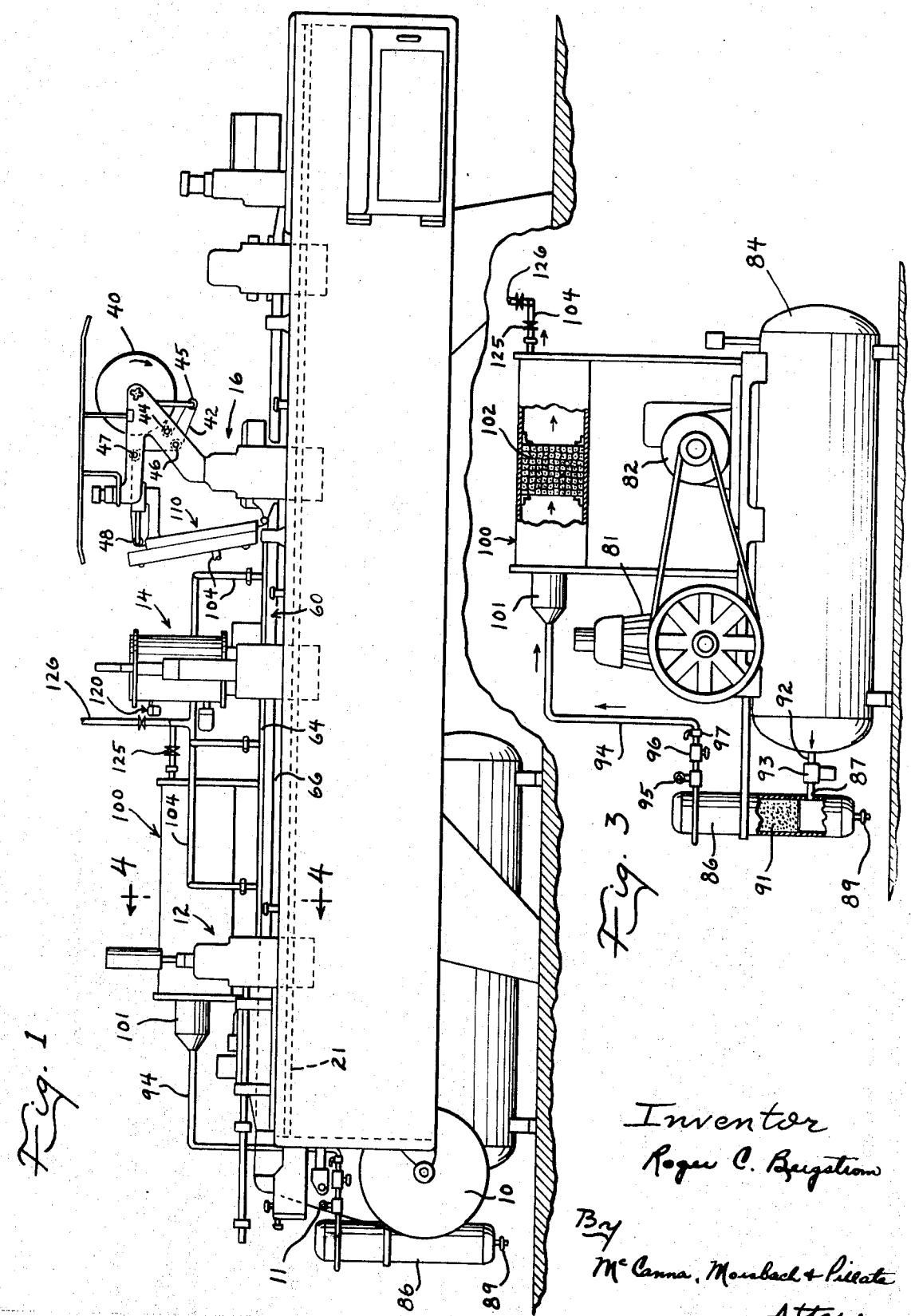

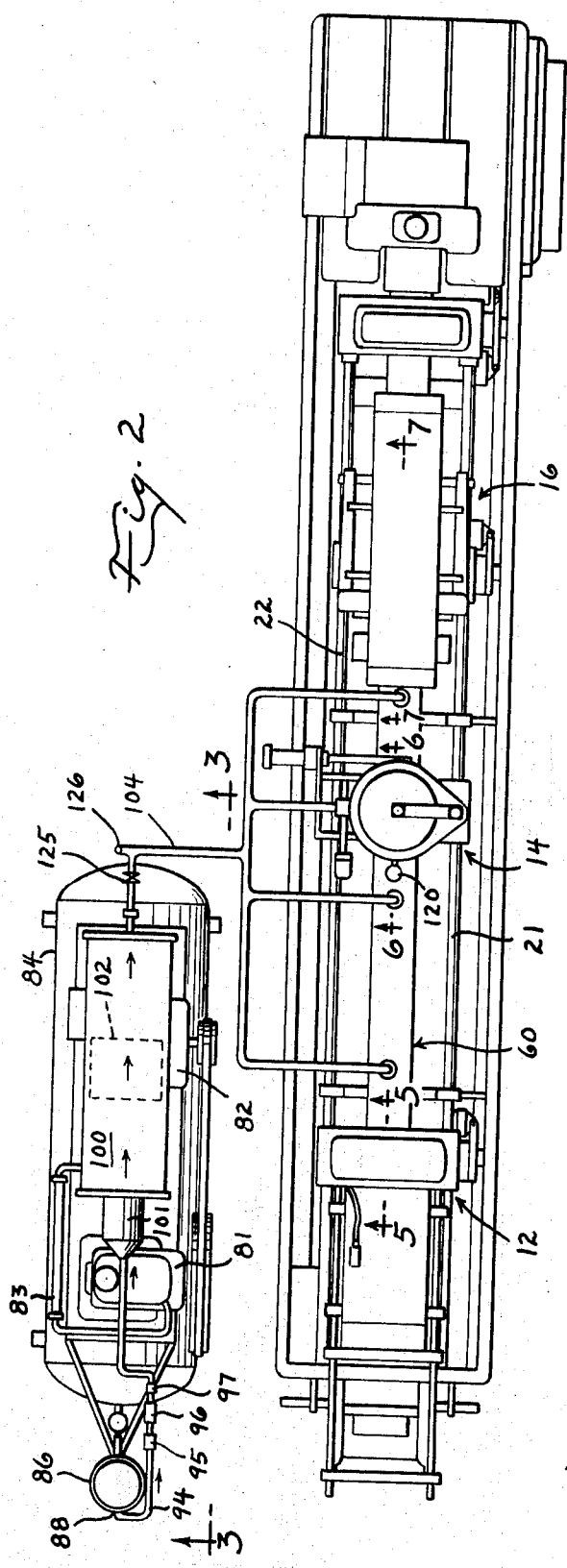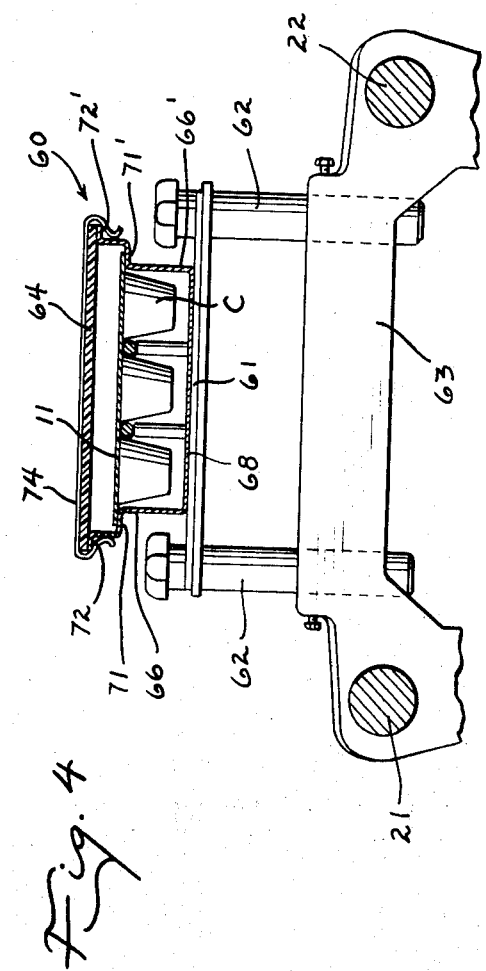

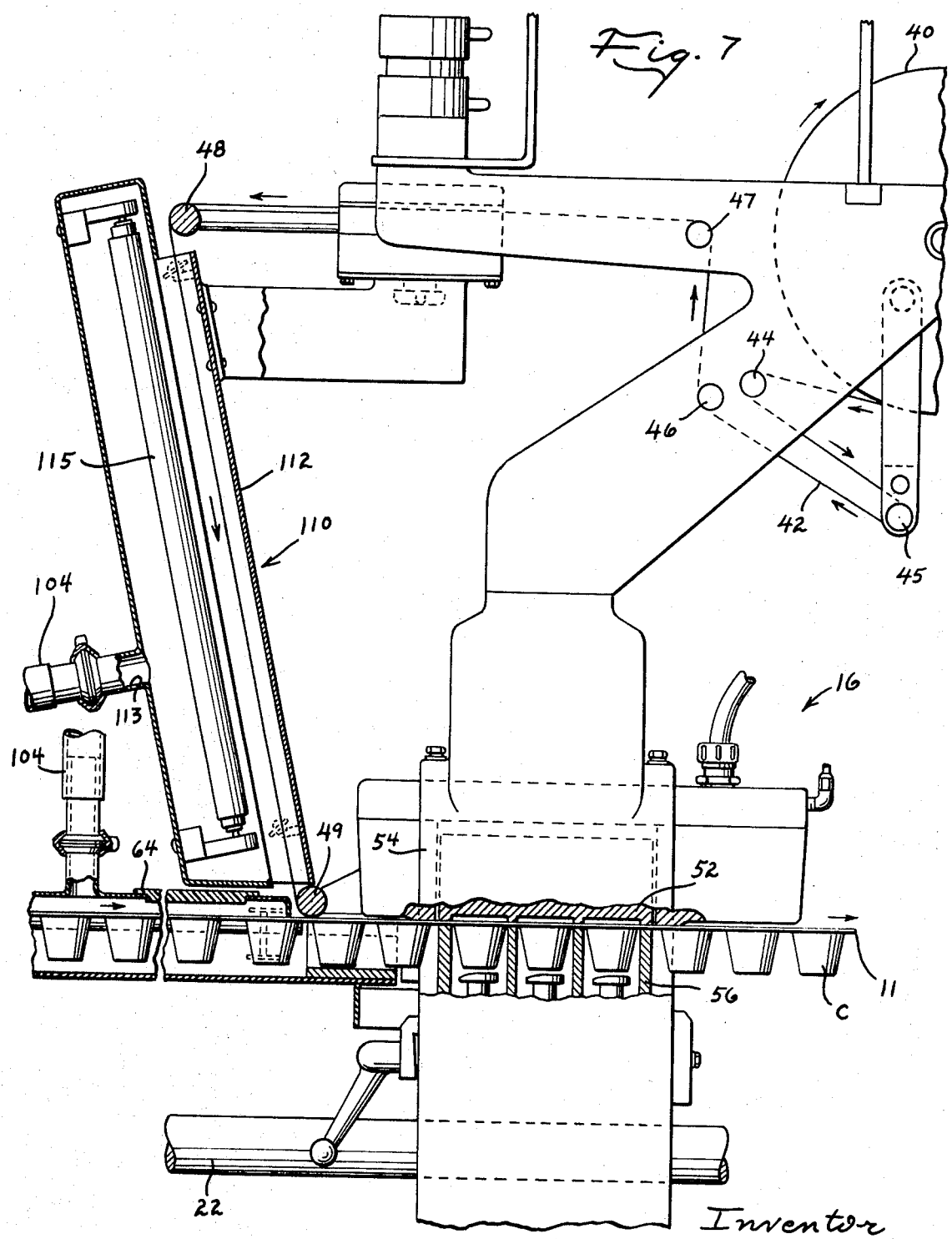

United States Patent Office 3,530,641
Patented Sept. 29, 1970

3,530,641
SANITARY PACKAGING MACHINE
Roger C. Bergstrom, Rockford, Ill., assignor to Anderson
Bros. Mfg. Co., Rockford, Ill., a corporation of Illinois
Filed Sept. 9, 1968, Ser. No. 758,396
Int. Cl. B65b 31/02
U.S. Cl. 53—167                    12 Claims

ABSTRACT OF THE DISCLOSURE

Apparatus is provided for forming containers in a strip of thermoplastic material and for advancing the strip to filling and sealing stations. A protective shroud extends from the forming station to the sealing station. Apparatus is provided for removing moisture and bacteria from the air and feeding it to the shroud at a relatively low pressure so the containers are maintained in a sanitary atmosphere until sealed.

Background

The invention pertains to packaging generally, and more particularly to apparatus for forming containers and subsequent filling and sealing in a sanitary manner.

The packaging art has provided machines in which a sheet of thermoplastic material is heated to a suitable forming temperature, a plurality of interconnected containers is formed in the sheet, and the sheet is advanced to filling and sealing stations. In these machines, however, the containers and product therein are exposed to atmosphere until a cover member is sealed to the container. Unfortunately, natural atmosphere contains moisture and microscopic particles including dust, bacteria, spores, pollen, etc. When packaging food stuffs, the presence of bacteria is, of course, detrimental.

Summary

The present invention relates generally to improvements in packaging apparatus, and more particularly to an improved machine for packaging under sanitary conditions.

It is a general object of the present invention to provide a packaging machine with improved sanitation features.

Another object is to provide a machine in accordance with the foregoing object, which forms interconnected containers from a strip of material and advances the strip for filling and sealing of the containers, and which protects the strip from contamination until it is sealed.

Still another object of the present invention is to provide a machine in accordance with any of the above objects and which includes a protective shroud and means for supplying sanitized air into the shroud.

These, and other objects and advantages of the invention, will become apparent as the invention becomes better understood from the following description when taken with the drawings.

Drawings

FIG. 1 is a front elevational view of an embodiment of the present invention;

FIG. 2 is a top plan view thereof;

Figure 5:
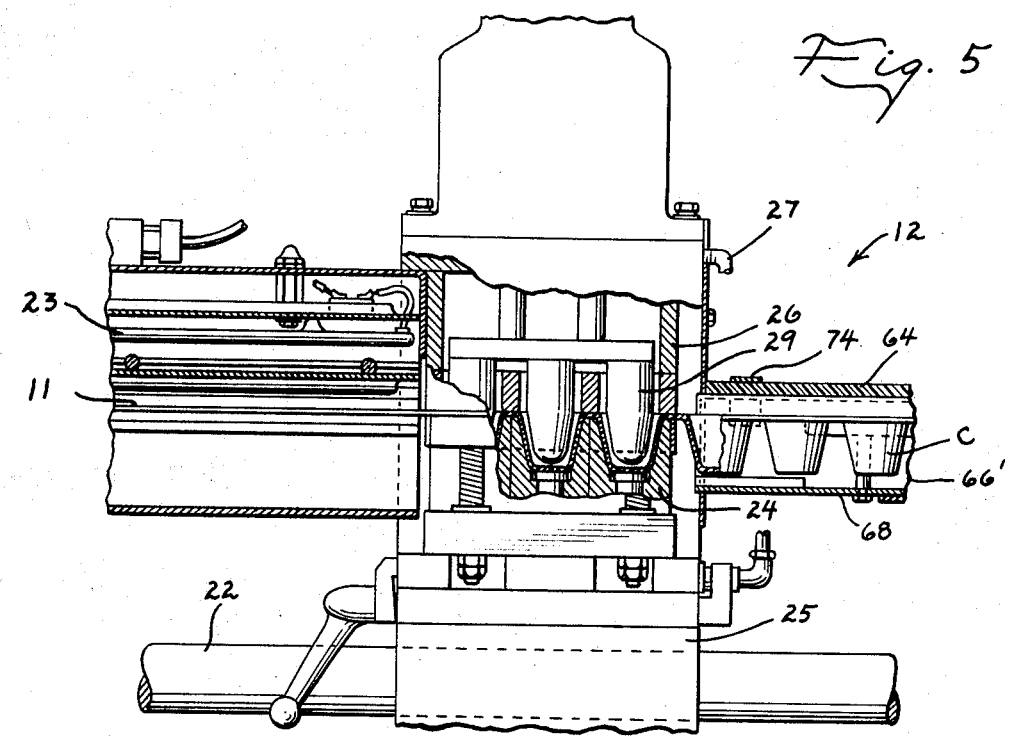
Figure 6:
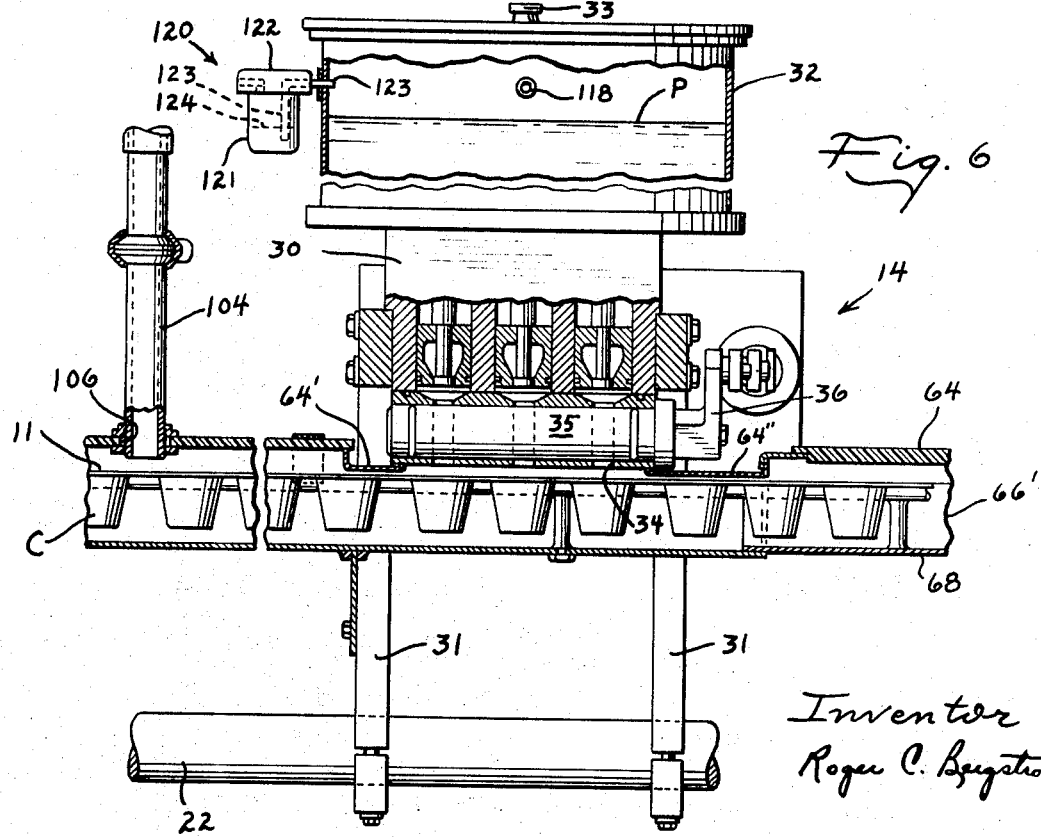

FIG. 3, on sheet one of the drawings, is an elevational view of the air sanitizing apparatus, as seen from line 3—3 of FIG. 2;

FIG. 4 is a fragmentary cross-sectional view through the shroud, taken generally along line 4—4 of FIG. 1, and on an enlarged scale; and FIGS. 5, 6, and 7 are large scale views of the forming, filling, and sealing stations, respectively, said views being partly elevational and partly sectional as seen generally from lines 5—5, 6—6, and 7—7 of FIG. 2.

Description

A reference is now made to the drawings wherein the same reference characters indicate the same parts throughout the several views. The drawings illustrate one embodiment of the present invention; said embodiment being the best presently known mode of carrying out the invention.

As best seen in FIG. 1, a roll 10 of thermoplastic material is supported adjacent one end of the machine. A strip 11 is withdrawn from the roll and advanced longitudinally of the machine past successive stations, preferably including a forming station 12, a filling station 14, and a sealing station 16. Stations for other operations may also be utilized if desired. In the embodiment illustrated, the machine is provided with laterally spaced, longitudinally extending support rails 21 and 22, best seen in FIG. 2. The support rails are utilized for mounting the parts at the various stations as hereafter described.

The strip 11 of thermoplastic material is first advanced to the forming station 12, best shown in FIG. 5. A heating head which includes a plurality of heating elements 23 is disposed above the strip 11 to heat the strip so that it may be formed into the desired shape. The web 11 is preferably heated to a germ-killing temperature; however, this is not absolutely necessary since thermoplastic material is a relatively inert material and may be rendered sterile by its own manufacturing process. Instead of the upper heating head shown, a lower heating head may be utilized or both the heating heads may be used together, if desired. A plurality of container C are then formed in the strip 11. In the embodiment illustrated, the container forming is accomplished by a die 24 movably mounted on a base 25 which is supported on the support rails 21 and 22. Die 24 moves vertically between an upper forming position illustrated in FIG. 5 and a lower position removed from the strip 11 so that the strip may be intermittently advanced. As shown, an upper forming head 26 cooperates with the die 24 and pressure is applied through an inlet 27 to press the strip 11 against the die 24 and form the container C. If desired, a plug-assist 29 may be utilized in the forming operation. It is contemplated that other types of forming may be utilized, if desired.

The intermittent advancement of the strip 11 may be accomplished in any convenient manner. In the present embodiment, a gripper (not shown) grips the lateral edges of the strip 11 and is reciprocated longitudinally of the machine to advance the strip.

While other shapes are contemplated, the container C is advantageously cup-like and has an outwardly projecting flange portion surrounding its open end. The flange portions are interconnected or, to put it another way, the formed container C remains integral with the strip 11. Preferably, the container C is formed inwardly of the edges of the strip, as shown in FIG. 4 for supporting the strip as hereafter explained.

After the container C is formed in the strip 11, it is advanced to the filling station 14, best shown in FIG. 6. A filler head 30 is located at the filling station 14 and is supported on the support rails 21, 22 by means of a plurality of legs 31. A product hopper 32 is disposed above the filler head for holding a product P. As shown, the hopper 32 is generally cylindrical in shape and has a product inlet 33 in the top side thereof. At the bottom of the filler head are openings 34 through which the product P may be dispensed into the containers. A valve member 35 is selectively rotatable as by an arm 36 to control dispensing of a preselected quantity of the product P into the containers C. While the product P may be any type which may be handled and packaged, in accordance with the present invention, it would be a product advantageously packaged under sanitary conditions.

After filling, the containers C are advanced to the sealing station 16 (see FIG. 7). A roll 40 of cover material is supported at the sealing station and a thin, flexible sheet 42 is withdrawn therefrom. Sheet 42 is adapted to be sealed to the peripheral flange of the container C and, for this purpose, compatible thermoplastic materials are preferably selected for strip 11 and sheet 42. Alternately, a cover material coated with a suitable thermoplastic material may be utilized. In this manner, the sealing may be accomplished by heat sealing. It should be understood, however, that other materials and other sealing methods may be used. In the embodiments illustrated, sheet 42 is entrained over rollers 44–49 to a position contiguous with the upper surface of strip 11 and overlying the containers C. The sealing is accomplished by a sealing head 52 disposed within a housing 54. The sealing head 52 and a lower member 56, located at the underside of the strip 11, are movable relative to each other and serve to press the cover sheet 42 against the strip 11 when in the sealing position illustrated in FIG. 7. The sealing head 52 preferably has a shape corresponding to the peripheral flange of the container C for sealing the cover sheet 42 thereto. The sealing head 52 may be heated in any convenient manner; or may be adapted for pressure sealing, if a pressure sensitive adhesive is utilized. Ultrasonic or high-frequency sealing and other sealing methods may also be used, if desired.

In accordance with the present invention, the packaging is accomplished under improved sanitary conditions. For this purpose, a generally imperforate shroud, generally designated 60, extends from the forming station 12 to the sealing station 16. The shroud 60 is supported on the machine in any convenient manner as, for example, by means of a cross member 61 supported on the support rails by means of an upright 62 and another cross member 63, as shown in FIG. 4. In the embodiment illustrated, shroud 60 includes a top member 64 overlying the strip 11, first and second side walls 66, 66' which depend to a level below the strip, and a bottom wall 68 interconnecting the side walls. Preferably the side walls 66, 66' have means for supporting the lateral edges of the strip 11. As shown, each side wall is disposed laterally to provide a flange 71, 71' to support the strip 11. At the top of each side wall is another laterally extending flange 72, 72' on which the top member 64 is supported, and for accommodating a spring fastener 74 to hold the top wall 64 contiguous to the flanges 72, 72'. As best seen in FIG. 1, the top member 64 extends from the upper forming head 26 to the filler head 30, and from the filler head to the sealing station 16. Preferably, the shroud 60 is closely adjacent the various stations for a purpose hereafter explained. As shown in FIG. 5, the various elements of the shrouds 60 are contiguous to the housing at the forming station. In FIG. 6 it can be seen that the bottom wall 68 of the shroud extends past the filling station and that the side walls are shaped to accommodate the filler head. The top wall 64 is conveniently provided with extensions 64' and 64" which are contiguous to the filler head. In this manner, the shroud is generally imperforate but open at its ends for the passage of the strip of formed containers.

It is well known that normal atmosphere contains microscopic particles which include bacteria, spores, pollen, dust, etc. In addition, normal atmosphere contains a certain amount of water vapor which may act as a carrier for the bacteria. In accordance with the present invention, ordinary atmosphere is to be sanitized and fed into the shroud 60 under a low pressure sufficient to provide a constant flow of sanitary air out of the ends of the shroud. In this manner, foreign substances are prevented from entering the shroud and contaminating the container C, the product P, or adjacent parts or areas.

Referring now to FIGS. 1–3, apparatus will be described for sanitizing the normal atmosphere and feeding the sanitized air to the shroud 60. A compressor 81, driven by a motor 82, is provided for compressing the air to relatively high pressure to concentrate any bacteria and water vapor in a relatively small volume. The high pressure air is fed through a water after cooler 83 and into a storage tank 84. A dryer chamber 86 is provided and has an inlet 87 adjacent the bottom and an outlet 88 adjacent the top thereof. Preferably, the inlet and outlet are at opposite sides of the dryer chamber. A drain 89 is provided adjacent the bottom of the dryer chamber 86 for ready removal of the moisture which the chamber has removed from the air. A desiccant 91 is contained in the dryer chamber 86 for removing the moisture and bacteria from the air to provide a generally sanitary air. The air is fed from the storage tank 84 through a conduit 92 to the inlet 87 of the dryer chamber. In the embodiment illustrated, an entry filter 93 is interposed in conduit 92 to remove any large particles prior to entry into the dryer chamber 86. A conduit 94 is connected to the outlet 88 (see FIG. 2) and extends to an expansion chamber 100. Interposed in conduit 94 are a pressure gauge 95, a pressure regulator 96, and a valve 97. The pressure regulator 96 regulates the flow of high pressure air through the conduit 94 to the expansion chamber 100 and may be set so that a desired flow of air out of the shroud 60 is properly accomplished. The expansion chamber 100 includes a nozzle 101 which expands the high pressure air and reduces its pressure. An air filter 102 is provided in the expansion chamber and is advantageously arranged to remove any particles 0.3 micron or larger. This gives final assurance of removal of any particles which may have passed filter 93 and the dryer chamber 86. The air filter 102 also provides an additional pressure drop in the expansion chamber 100. A low pressure conduit 104 extends from the expansion chamber 100 and has a plurality of branches connected to air inlet openings 106 provided in the top member 64 of the shroud. In this manner, the air is compressed to a relatively high pressure to concentrate the bacteria and water vapor, and then expanded to a relatively low pressure but sufficient to provide a flow of air out of the shroud and prevent the entry of foreign particles into the shroud. Additionally, compressing the air enables a longer residence time in the dryer chamber 86 and also lowers the dew point thereby aiding the dryer chamber to more easily remove the moisture.

Referring to FIG. 7, there is illustrated in detail a shroud portion, generally designated 110. The shroud portion includes a housing 112 generally surrounding the sheet 42 of cover material between rollers 48 and 49. The housing 112 has an air inlet opening 113 connected to the conduit 104 for receiving the sanitary air. Disposed in the housing 112 are a battery of ultraviolet lamps 115 disposed about ½ inch from the underside of the cover material which is the side adjacent the product P in the containers. A sterilizing solution, such as hydrogen peroxide, can be used with the ultraviolet lamps for sterilizing the cover material, or in the alternative, a sterilizing solution may be used alone. The housing serves to confine the sanitary air fed thereto and the flow of air outside of the shroud portion 110 prevents the entry of foreign particles. In this manner, the cover material is sanitized prior to sealing to the strip of formed containers.

FIG. 6 illustrates the filling station which includes the aforedescribed hopper 32 for holding the product P. The product is fed into the hopper through the product inlet 33 and means is provided for controlling the level of the product so that it is disposed at a level below the top of the hopper. This means may be in the form of an electric probe, a float valve, or the like. As shown, the hopper 32 has an air inlet 118 above the product level and connected to the conduit 104, as best seen in FIG. 6. In this manner, the sanitized air is fed into the air space above the product level under a low pressure to keep that head or air space in a sanitary condition. A one-way check valve in the form of a liquid-type device 120 arranged at one side of the hopper 32 allows for the escape of air therefrom. The device 120 includes a transparent bottom portion 121 and a cap 122. A quantity of chlorinated water or other purified liquid 124 is disposed in the device and a conduit 123 has its discharge opening below the level thereof. As shown, the inlet of conduit 123 communicates with the inside of hopper 32 above the product level therein. In this manner, when the sanitary air is flowing, air escapes through the device, bubbling through the liquid, and giving a visual indication that sanitary air is flowing. The level of liquid 124 above the discharge opening of conduit 123 controls the pressure of air maintained in the head space of hopper 32.

As shown in FIGS. 1–3, conduit 104 is provided with a valve 125 adjacent the expansion chamber 100 to shut off the flow of air. Another conduit 126 is connected to conduit 104 and to a source of steam (not shown) for periodically sterilizing the product hopper 32 and conduit 104.

It is now deemed obvious that the present invention provides a sanitary packaging machine which includes a shroud which protects the strip of formed containers from forming until sealing, and apparatus for sanitizing air and supplying the same into the shroud to prevent the entry of foreign particles.

What is claimed is:

1. A sanitary packaging machine having a filling station and a sealing station; a conveyor for advancing a plurality of containers past said station; means at at least one of said stations and overlying the conveyor for providing an imperforate shroud thereover; said shroud having generally open ends for advancing of the containers therethrough; and means for supplying sanitary air into the shroud under a low pressure sufficient to provide a constant flow of sanitary air out of the ends of the shroud and including a compressor for compressing air to a relatively high pressure to concentrate any bacteria in a relatively small volume, a dryer chamber having an inlet and an outlet, a desiccant in the dryer chamber for removing moisture bacteria from the air and provide a generally sanitary air, means for operatively connecting the dryer chamber inlet to the compressor, an expansion chamber operatively connected to the dryer chamber outlet for receiving the relatively high pressure sanitary air and expanding the same approximately to said low pressure, and conduit means connecting the expansion chamber to the shroud for delivering the sanitary air into the shroud under low said pressure.

2. A sanitary packaging machine as set forth in claim 1 including a microscopic filter in the expansion chamber for removing microscopic particles from the air and for creating a pressure drop in the air passing through the filter.

3. A sanitary packaging machine as set forth in claim 2 including a conduit interconnecting the dryer chamber outlet and the expansion chamber, and a pressure regulator interposed in the conduit for regulating the high pressure air flowing therethrough.

4. A sanitary packaging machine as set forth in claim 1 wherein the filling station includes a filler disposed above the advanced containers and including an upwardly extending product hopper, a valved outlet at the bottom of the hopper for dispensing the product into the containers, means for feeding product into the hopper to a preselected level below the top thereof to provide an air space above the product level, and said hopper having an air inlet above the product level; wherein the shroud extends from the filler to the sealing station and has an air inlet intermediate the filler and sealing station; and wherein the conduit means is connected to said air inlet.

5. In a packaging machine including a forming station, a filling station, and a sealing station; means for supplying a strip of thermoplastic material to the forming station; means at the forming station for heating the thermoplastic material; forming means at the forming station for forming containers in the strip of thermoplastic material; a conveyor for advancing the strip of formed containers to the filling and sealing stations; means at the filling station for depositing a quantity of a material to be packaged in each container; and means for supplying a cover material to the sealing station and for sealing the cover material to the container; the improvement comprising: a shroud extending from the forming station to the sealing station overlying the strip of formed containers; and means for supplying sanitary air into the shroud to provide a flow of sanitary air from the shroud at the forming and sealing stations, whereby the containers are kept in a sanitary atmosphere from forming until provided with a sealed cover; said last-mentioned means including a supply of air under pressure, a dryer chamber associated with said supply, a desiccant in the dryer chamber for removing moisture and bacteria from the air as it passes through the dryer chamber and provides a generally sanitary air.

6. A packaging machine as set forth in claim 5 wherein the means for supplying the cover material includes a holder disposed above the conveyor for holding a roll of sheet cover material, and means for directing the sheet of cover material to a position overlying the containers; and the shroud includes a portion surrounding the sheet of cover material before it reaches the overlying position; and including means disposed in said shroud portion for sanitizing the underside of the cover material.

7. A packaging machine as set forth in claim 6 wherein the means for sanitizing the underside of the cover material includes a battery of ultra-violet lights in said shroud portion and closely adjacent the underside of the cover material.

8. A packaging machine as set forth in claim 5 wherein the filling station includes a filler disposed above the strip of formed containers and including a product hopper having an outlet at the bottom, valve means for controlling dispensing of product from the hopper into the container, means for feeding product into the hopper to a preselected level below the top to provide an air space above the product level, said hopper having an air inlet above the product level, and wherein the means for supplying sanitary air is connected to said air inlet to also supply sanitary air to the space above the product level.

9. A packaging machine as set forth in claim 8 wherein the supply of air under pressure includes a storage tank, a compressor for compressing the air to a relatively high pressure to concentrate any bacteria and moisture in a relatively small volume, and a conduit connecting the storage tank with the dryer chamber to deliver the compressed air thereto under the relatively high pressure; and wherein the means for supplying sanitary air includes an expansion chamber operatively connected to the dryer chamber for receiving the relatively high pressure sanitary air therefrom and expanding the same to a relatively low pressure, and conduits leading from the expansion chamber to the hopper air inlet and to the shroud for supplying the low pressure sanitary air thereto.

10. A packaging machine as set forth in claim 5 wherein the shroud includes an imperforate top member overlying the strip of formed containers, and extending from the forming station to the filling station and there from to the sealing station, first and second imperforate side walls connected to the top member at opposite sides thereof and depending to a level below the strip of formed containers, an imperforate bottom wall extending be-between the side walls to provide the shroud which is open at its ends for passage of the strip of formed containers, and means on the side walls for supporting the lateral edges of the strip.

11. In a packaging machine including forming, filling, and sealing stations, means for supplying a generally continuous strip of formable material to the forming station, means at the forming station including an upper head disposed above the strip and a lower head disposed below the strip for forming interconnected open-topped containers in the strip, a conveyor for advancing the sheet from the forming station to the filling and sealing stations, a filler head at the filling station disposed above the strip of formed containers for dispensing a quantity of product into the containers, means for supplying a generally continuous sheet of cover material to the sealing station, and a sealing head at the sealing station for sealing the cover material to the container, the improvement comprising: a shroud for protecting the strip of formed containers and including an imperforate top member overlying the strip and extending from the upper forming head to the filler head and from the filler head to the sealing station, first and second side walls connected to the top member at opposite sides thereof and depending to a level below the strip, and means on the side walls for supporting the lateral edges of the strip.

12. A packaging machine as set forth in claim 11 wherein the shroud includes a bottom wall interconnecting the side walls, said walls and top member providing a tubular enclosure open at its ends at the forming and sealing stations for the passage of the strip of formed containers, and said shroud having a plurality of air inlet openings therein; and including means for supplying sanitary air into the shroud through said air inlets and under a low pressure sufficient to provide a constant flow of sanitary air out of the ends of the shroud and including: a compressor for compressing air to a relatively high pressure to concentrate any moisture and bacteria in a relatively small volume, a dryer chamber having an outlet and an inlet operatively connected to the compressor, a desiccant in the dryer chamber for removing moisture and bacteria from the air to provide a generally sanitary air, an expansion chamber operatively connected to the dryer chamber outlet for receiving the relatively high pressure sanitary air and expanding the same approximately to said low pressure, and conduit means connecting the expansion chamber to said shroud air inlets for delivering sanitary air thereto under said low pressure.

References Cited
UNITED STATES PATENTS

| | | | |
|---|---|---|---|
| 2,918,770 | 12/1959 | Stocker | 53—180 |
| 3,383,831 | 5/1968 | Goldsmith et al. | 58—180 X |
| 3,430,411 | 4/1969 | Ollier et al. | 53—30 |

THERON E. CONDON, Primary Examiner

E. F. DESMOND, Assistant Examiner

U.S. Cl. X.R.

53—184

PO-1050
(5/69)

UNITED STATES PATENT OFFICE
CERTIFICATE OF CORRECTION

Patent No. 3,530,641      Dated September 29, 1970

Inventor(s) Roger C. Bergstrom

It is certified that error appears in the above-identified patent and that said Letters Patent are hereby corrected as shown below:

Column 5, line 28, "station" should be -- stations -- as in Claim 1, line 3 of the application;

Line 39, inserted after "moisture" should be -- and -- as in Claim 1, line 13 of the application.

SIGNED AND
SEALED
DEC 15 1970

(SEAL)
Attest:

Edward M. Fletcher, Jr.
Attesting Officer

WILLIAM E. SCHUYLER, JR.
Commissioner of Patents